(12) United States Patent
Wei et al.

(10) Patent No.: US 11,310,894 B2
(45) Date of Patent: Apr. 19, 2022

(54) LED DRIVER, LED SYSTEM AND SIGNAL TRANSMITTING METHOD FOR LED

(71) Applicant: CURRENT LIGHTING SOLUTIONS, LLC, East Cleveland, OH (US)

(72) Inventors: Hongbin Wei, ShangHai (CN); Longyu Chen, ShangHai (CN); Timothy Alan Taubert, East Cleveland, OH (US)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 16/970,661

(22) PCT Filed: Jan. 22, 2019

(86) PCT No.: PCT/US2019/014434
§ 371 (c)(1),
(2) Date: Aug. 18, 2020

(87) PCT Pub. No.: WO2019/172995
PCT Pub. Date: Sep. 12, 2019

(65) Prior Publication Data
US 2020/0396809 A1 Dec. 17, 2020

(30) Foreign Application Priority Data
Mar. 5, 2018 (CN) .................. 201810178552.X

(51) Int. Cl.
*H05B 47/18* (2020.01)
*H05B 45/14* (2020.01)
(Continued)

(52) U.S. Cl.
CPC ........... *H05B 47/18* (2020.01); *H04B 10/116* (2013.01); *H05B 45/14* (2020.01); *H05B 45/30* (2020.01); *H05B 45/10* (2020.01)

(58) Field of Classification Search
CPC ...... H04B 10/116; H05B 45/10; H05B 45/14; H05B 45/30; H05B 47/18
See application file for complete search history.

(56) References Cited

U.S. PATENT DOCUMENTS 10,141,739 B1 * 11/2018 Davis .................. H02J 5/00
2010/0060194 A1 3/2010 Furry et al.
(Continued)

FOREIGN PATENT DOCUMENTS

CN 106664780 A 5/2017

OTHER PUBLICATIONS

International Search Report and Written Opinion dated Jul. 4, 2019 which was issued in connection with counterpart PCT Application No. PCT/US2019/014434 which was filed on Jan. 22, 2019.
(Continued)

*Primary Examiner* — Terrell S Johnson
(74) *Attorney, Agent, or Firm* — Buckley, Maschoff & Talwalkar LLC

(57) ABSTRACT

A driver comprises a controller coupled with a LED, and an interface circuit configured to be coupled between the controller and an external device. The interface circuit comprises an interface port configured to be coupled to the external device, an analog interface module, a digital interface module and a power supply module. The analog interface module is coupled between the interface port and the controller and configured to transmit an analog signal therebetween the external device and the controller in a first mode. The digital interface module is coupled between the interface port and the controller and configured to transmit (Continued)

a digital signal between the external device and the controller in a second mode and a third mode. The power supply module is coupled to the interface port and configured to provide energy to the external device in the first mode and the third mode.

15 Claims, 3 Drawing Sheets

(51) Int. Cl.
*H05B 45/30* (2020.01)
*H04B 10/116* (2013.01)
*H05B 45/10* (2020.01)

(56) References Cited

U.S. PATENT DOCUMENTS

| | | |
|---|---|---|
| 2013/0147367 A1 | 6/2013 | Cowburn |
| 2013/0221944 A1* | 8/2013 | Cheng ............... H02M 3/157 |
| | | 323/318 |
| 2014/0028199 A1 | 1/2014 | Chemel |
| 2014/0265935 A1 | 9/2014 | Sanwick et al. |
| 2015/0120004 A1 | 4/2015 | Jimi et al. |
| 2016/0119990 A1 | 4/2016 | Williams et al. |
| 2017/0231055 A1* | 8/2017 | Yadav ................. H05B 45/10 |
| 2017/0359874 A1* | 12/2017 | Tikkanen ........... H05B 47/175 |

OTHER PUBLICATIONS

Office Action Issued in China Patent Application No. 201810178552.X dated Jan. 5, 2021, 13 Pages (English Translation attached).

* cited by examiner

LED DRIVER, LED SYSTEM AND SIGNAL TRANSMITTING METHOD FOR LED

BACKGROUND

Embodiments of the present disclosure relate generally to LED drivers, LED systems and signal transmitting methods for LEDs.

Nowadays, external modules, such as dimming controllers, DALI controllers and sensors can be coupled to a LED driver via an interface circuit to realize various functions.

The conventional interface circuit usually provides different interface ports for different types of external modules, so there are several ports on the conventional interface circuit, wherein each port may comprise two or more wires. Therefore, the conventional LED driver comprising the interface circuit and capable of supporting multiple functions requires a lot of wiring efforts, which is a pain point that manufacturers and customers suffer.

Therefore, it is desirable to provide new LED drivers, LED systems and signal transmitting methods for LED to solve the above-mentioned problem.

BRIEF DESCRIPTION

In one aspect, embodiments of the present disclosure relate to a driver for an LED configured to be coupled between the LED and an external device. The driver comprises a controller coupled with the LED and an interface circuit configured to be coupled between the controller and the external device. The interface circuit comprises an interface port configured to be coupled to the external device. The interface circuit also comprises an analog interface module, a digital interface module and a power supply module. The analog interface module is coupled between the interface port and the controller and configured to transmit an analog signal between the external device and the controller via the interface port in a first mode. The digital interface module is coupled between the interface port and the controller and configured to transmit a digital signal between the external device and the controller via the interface port in a second mode and a third mode. The power supply module is coupled to the interface port and configured to provide energy to the external device via the interface port in the first mode and the third mode.

In another aspect, embodiments of the present disclosure relate to an LED system configured to communicate with an external device. The LED system comprises a LED, a controller coupled with the LED and an interface circuit configured to be coupled between the controller and the external device. The interface circuit comprises an interface port configured to be coupled to the external device. The interface circuit also comprises an analog interface module, a digital interface module and a power supply module. The analog interface module is coupled between the interface port and the controller and configured to transmit an analog signal between the external device and the controller via the interface port in a first mode. The digital interface module is coupled between the interface port and the controller and configured to transmit a digital signal between the external device and the controller via the interface port in a second mode and a third mode. The power supply module is coupled to the interface port and configured to provide energy to the external device via the interface port in the first mode and the third mode.

In yet another aspect, embodiments of the present disclosure relate to a method for transmitting a signal between an external device and an LED. The method comprises transmitting the signal by an interface circuit coupled between the external device and a controller, wherein the controller is coupled with the LED and the interface circuit is coupled with the external device via an interface port. The transmitting of the signal comprises transmitting an analog signal between the external device and the controller via the interface port by an analog interface module in a first mode, transmitting a digital signal between the external device and the controller via the interface port by a digital interface module in a second mode and a third mode, and providing energy to the external device via the interface port by a power supply in the first mode and the third mode.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

In an effort to provide a concise description of these embodiments, not all features of an actual implementation are described in one or more specific embodiments. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort would nevertheless be a routine undertaking of design, fabrication, and manufacture for those of ordinary skill having the benefit of the present disclosure.

Unless defined otherwise, technical and scientific terms used herein have the same meaning as is commonly understood by one of ordinary skill in the art to which the present disclosure belongs. The terms "first," "second," "third," "fourth," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either any, several, or all of the listed items. The use of "including," "comprising," or "having," and variations thereof herein are meant to encompass the items listed thereafter and equivalents thereof as well as additional items.

Embodiments of the present disclosure relate to a light-emitting diode (LED) system, which can communicate with different types of external devices via a unified interface port to realize multiple functions without changing any hardware.

Figure 1:
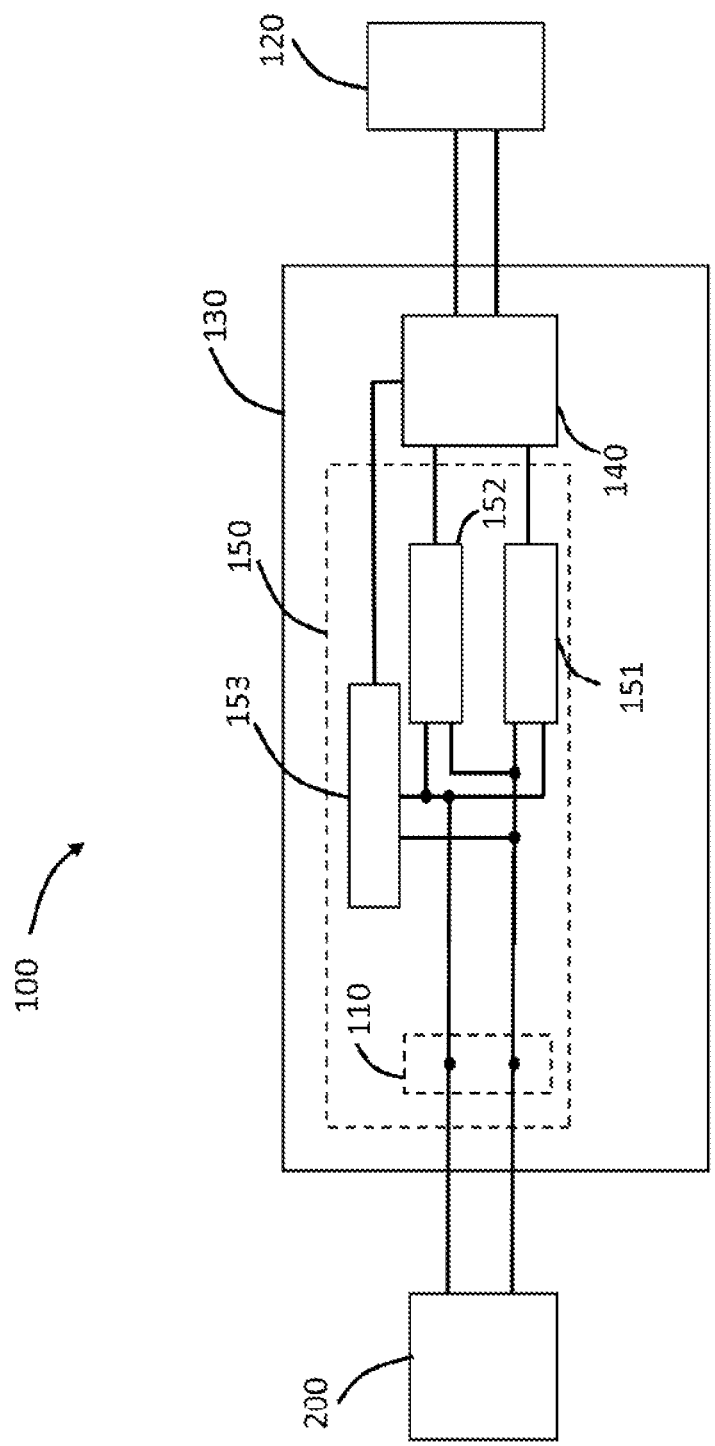
FIG. 1 is a sketch view of an LED system which comprises a driver in accordance with an exemplary embodiment of the present disclosure.

FIG. 1 is a sketch view illustrating an LED system 100, configured to communicate with an external device 200.

Referring to FIG. 1, the LED system 100 comprises an LED 120 and a driver 130. The driver 130 is configured to be coupled between the LED 120 and the external device 200, to drive the LED 120 and transmit a signal between the external device 200 and the LED 120.

The driver 130 comprises a controller 140 and an interface circuit 150. The controller 140 is coupled with the LED 120 and configured to control the LED 120 according to a control signal. The interface circuit 150 is configured to be coupled between the external device 200 and the controller 140 to transmit a signal therebetween. In some embodiments, the interface circuit 150 is configured to transmit the control signal from the external device 200 to the controller 140.

As shown in FIG. 1, the interface circuit 150 comprises an interface port 110, an analog interface module 151, a digital interface module 152 and a power supply module 153. Both of the analog interface module 151 and the digital interface module 152 are coupled between the controller 140 and the interface port 110. The analog interface module 151 is configured to transmit an analog signal between the external device 200 and the controller 140 via the interface port 110 in a first mode. The digital interface module 152 is configured to transmit a digital signal between the external device 200 and the controller 140 via the interface port 110 in a second mode and a third mode.

The power supply module 153 is coupled to the interface port 110 and configured to provide energy to the external device 200 via the interface port 110 in the first mode and the third mode. In some embodiments, the power supply module 153 has a first output current limit in the first mode and a second output current limit in the third mode. The "output current limit" as used herein refers to a maximum current value the voltage source can output. The second output current limit may be larger than the first output current limit, in such a manner that the power supply module 153 can provide two different current capacities respectively in the two modes to satisfy different demands.

In the first mode, the controller 140 is configured to enable the analog interface module 151 and the power supply module 153. The analog interface module 151 is configured to transmit the analog signal between the external device 200 and the controller 140. The power supply module 153 having the first output current limit is configured to provide energy to the external device 200 via the interface port 110.

For example, in the first mode, the external device 200 may comprise a dimmer, and the dimmer is energized by the power supply module 153 having the first output current limit in this mode. The analog interface module 151 may comprise a dimming interface configured to transmit a dimming signal from the dimmer 200 to the controller 140 as the control signal. Specifically, the dimming interface 151 is configured to receive a dimming signal from the dimmer 200 via the interface port 110 and transmit the dimming signal to the controller 140. The controller 140 is configured to control the LED 120 according to the dimming signal.

In the second mode, the controller 140 is configured to enable the digital interface module 152 and disable the analog interface module 151. The digital interface module 152 is configured to transmit the digital signal between the external device 200 and the controller 140. The power supply module 153 may be disabled by the controller 140, or the power supply module 153 having the first output current limit may still work in the second mode.

For example, in the second mode, the external device 200 may comprise a digital addressable lighting interface (DALI) master. The digital interface module 152 may comprise a DALI module, configured to transmit DALI signals between the DALI master 200 and the controller 140. In some embodiments, the DALI module 152 is configured to transmit a DALI signal from the DALI master 200 to the controller 140 as the control signal. The controller 140 is configured to control the LED 120 according to the DALI signal.

In the third mode, the controller 140 is configured to enable the digital interface module 152 and the power supply module 153 and disable the analog interface module 151. The digital interface module 152 is configured to transmit a digital signal between the external device 200 and the controller 140. The power supply module 153 having the second output current limit is configured to energize the external device 200 via the interface port 110.

For example, in the third mode, the external device 200 may comprise a sensor, configured to detect parameters of the LED 120 or environmental parameters. The sensor is energized by the power supply module 153 having the second output current limit in this mode. The digital interface module 152 comprises a DALI module, configured to transmit data indicating the parameters between the controller 140 and the sensor 200. In some embodiments, the DALI module 152 is configured to transmit data indicating the environmental parameters from the sensor 200 to the controller 140. The controller 140 is configured to control the LED 120 based on the environmental parameters. In some other embodiments, the DALI module 152 is configured to transmit data indicating the LED parameters from the controller 140 to the sensor 200. The sensor 200 may be coupled with a server (not shown), which is configured to collect the data from the sensor.

Compared with conventional drivers or interface circuits, the driver or the interface circuit in present disclosure is compatible with various external devices by using one unified interface port, in such a manner that redundant output wires and auxiliary components can be reduced or eliminated. In some embodiments, the interface port 110 comprises two terminals, each of which can be connected to one wire. Thus, each terminal in the interface port 110 is configured to be coupled to the external device 200 via a wire.

Figure 2:
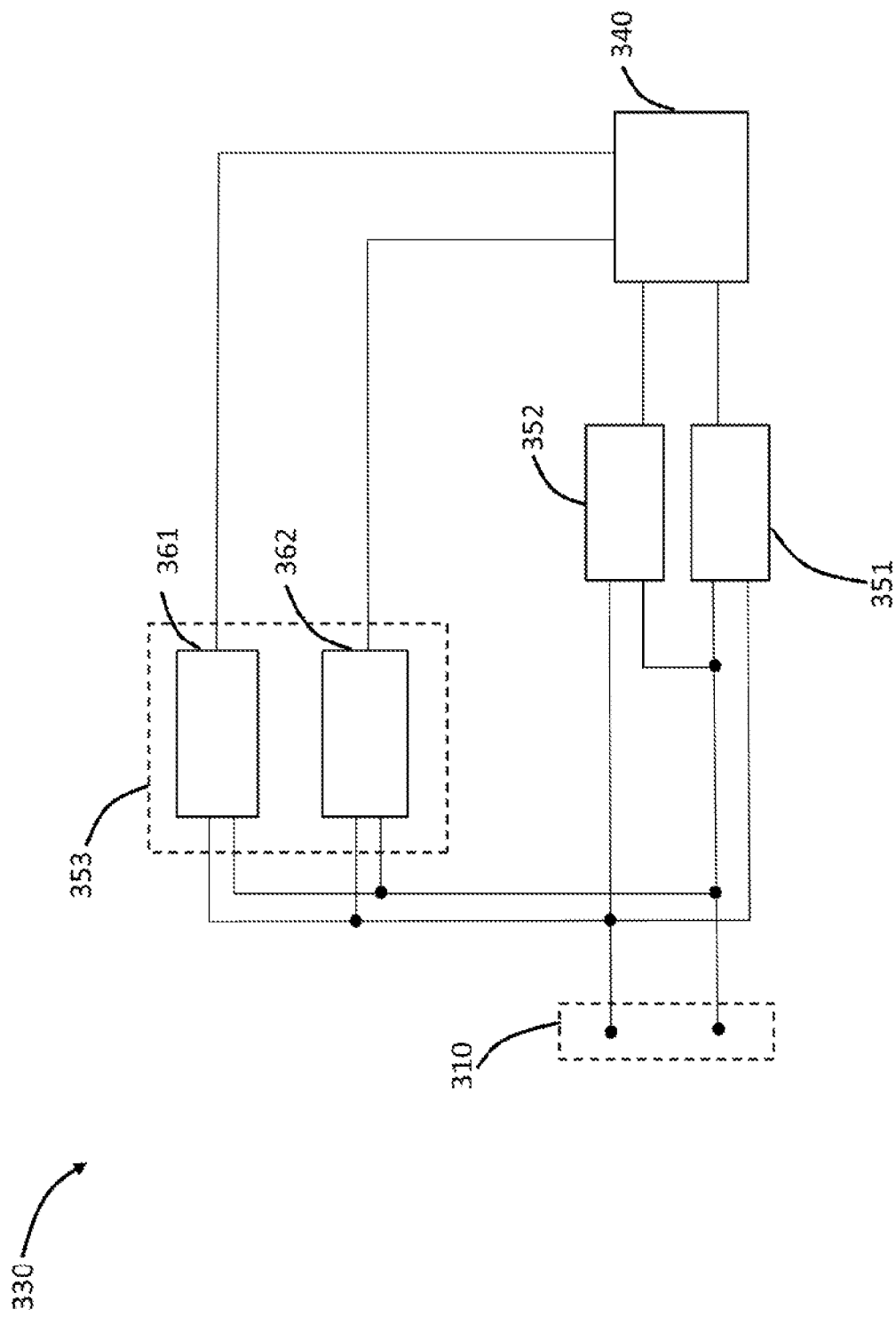
FIG. 2 is a sketch view illustrating a first driver in accordance with an exemplary embodiment of the present disclosure.

FIG. 2 is a sketch view illustrating a driver 330 in accordance with an exemplary embodiment of the present disclosure. Referring to FIG. 2, the driver 330 comprises a controller 340, an interface port 310, an analog interface module 351, a digital interface module 352 and a power supply module 353.

Functions of the controller 340, the interface port 310, the analog interface module 351 and the digital interface module 352 are respectively similar with the controller 140, the interface port 110, the analog interface module 151 and the digital interface module 152 of the embodiment shown in FIG. 1, which will not be repeated here.

As shown in FIG. 2, the power supply module 353 comprises a first voltage source 361 having the first output current limit and a second voltage source 362 having a second output current limit, wherein the second output current limit is larger than the first output current limit. The first voltage source 361 can be designed to have the first output current limit by setting proper parameters of elements therein. Similarly, the second voltage source 362 can be designed to have the second output current limit by setting proper parameters of elements therein.

The first and second voltage sources 361, 362 are coupled to the interface port 310 and configured to provide energy via the interface port 310. Both of the first and second voltage sources are also coupled with the controller 340, and can be enabled or disabled independently by the controller 340. In the first mode, the controller 340 is configured to enable the first voltage source 361 and disable the second voltage source 362, so that only the first voltage source works to provide energy in the first mode. In the second mode, the controller 340 is configured to disable the first and second voltage source 361, 362, so that neither of the first and second voltage source provide energy in the second mode. In the third mode, the controller 340 is configured to enable the second voltage source 362 and disable the first voltage source 361, so that only the second voltage source provides energy in the third mode.

Figure 3:
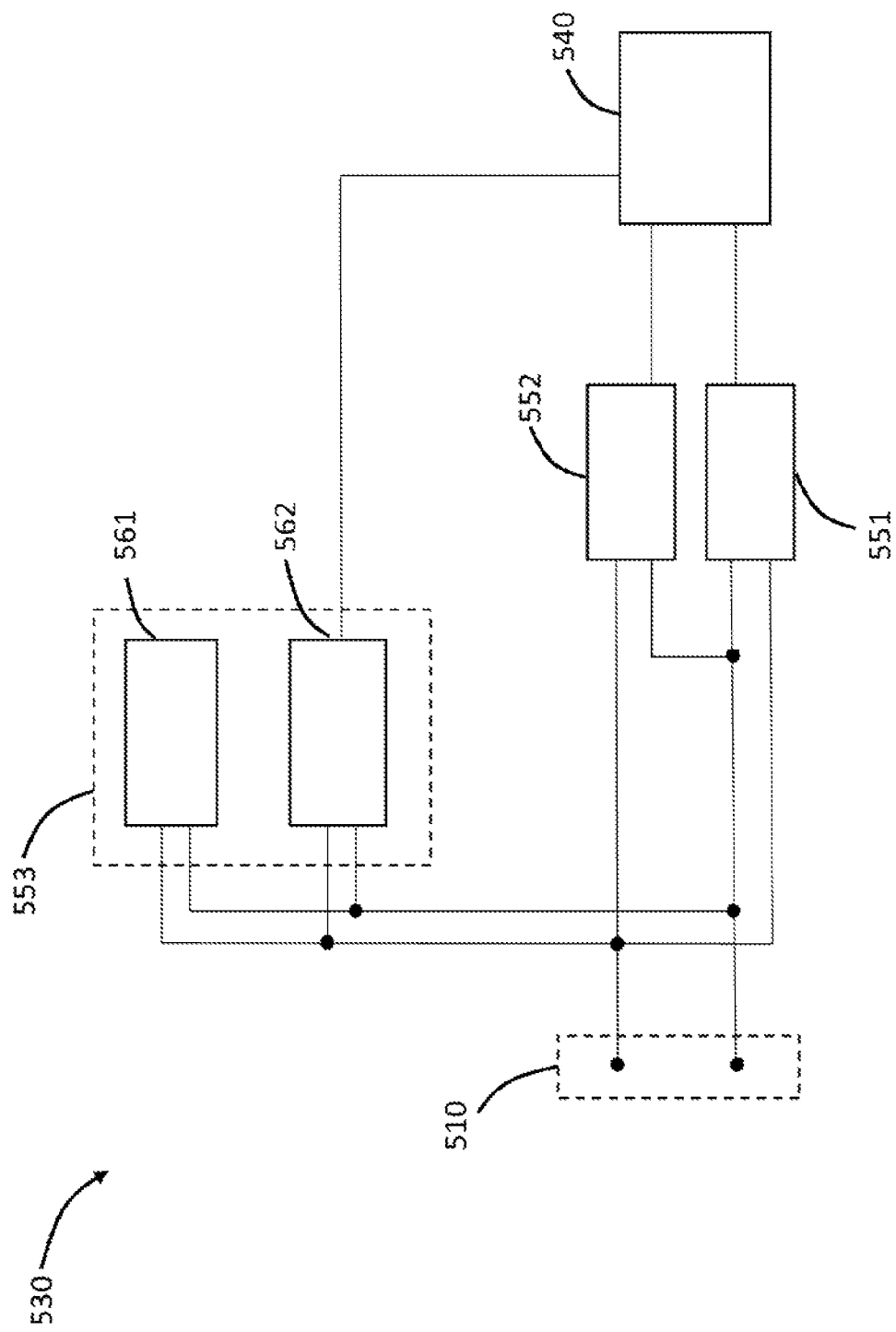
FIG. 3 is a sketch view illustrating a second driver in accordance with an exemplary embodiment of the present disclosure.

FIG. 3 is a sketch view illustrating a driver 530 in accordance with another exemplary embodiment of the present disclosure. Referring to FIG. 3, the driver 530 comprises a controller 540, an interface port 510, an analog interface module 551, a digital interface module 552 and a power supply module 553.

Functions of the controller 540, the interface port 510, the analog interface module 551 and the digital interface module 552 are respectively similar with the controller 140, the interface port 110, the analog interface module 151 and the digital interface module 152 of the embodiment shown in FIG. 1, which will not be repeated here.

As shown in FIG. 3, the power supply module 553 comprises a first voltage source 561 having the first output current limit and a second voltage source 562 having a second output current limit, wherein the second output current limit is larger than the first output current limit. The first voltage source 561 can be designed to have the first output current limit by setting proper parameters of elements therein. Similarly, the second voltage source 562 can be designed to have the second output current limit by setting proper parameters of elements therein.

The first voltage source 561 is coupled to the interface port 510 and configured to provide energy to the external device in all of the first, second and third modes. The second voltage source 562 is coupled to the interface port 510 and the controller 540, and the second voltage source 562 can be enabled or disabled by the controller 540. The controller 540 is configured to disable the second voltage source 562 in the first mode and second mode, and enable the second voltage source in the third mode. In this case, only the second voltage source 562 is controllable, and the first voltage source 561 works in all the modes, in such a manner that a circuit structure of the power supply module can be simplified to improve reliability.

In some other embodiments, in relation to the driver of FIG. 2 or the driver of FIG. 3 or in general, the power supply module comprises a voltage source (not shown) having an adjustable output current limit. The controller is configured to adjust the output current limit of the voltage source. The voltage source is adjusted to have the first output current limit in the first mode and the second output current limit in the third mode.

Embodiments of the present disclosure also relate to a method for transmitting a signal between an external device and an LED. The method relates to transmitting the signal by an interface circuit coupled between the external device and a controller, wherein the interface circuit is coupled with the external device via an interface port and the controller is coupled with the LED.

The step of transmitting the signal comprises transmitting an analog signal between the external device and the controller via the interface port by an analog interface module in a first mode; transmitting a digital signal between the external device and the controller via the interface port by a digital interface module in a second mode and a third mode; and providing energy to the external device via the interface port by a power supply in the first mode and the third mode, wherein the power supply module has a first output current limit in the first mode and a second output current limit different than the first output current limit in the third mode. The second output current limit may be larger than the first output current limit in the third mode.

The method further comprises enabling the analog interface module and the power supply module in the first mode; enabling the digital interface module, and disabling the analog interface module in the second mode; and enabling the digital interface module and the power supply module, and disabling the analog interface module in the third mode.

As will be understood by those familiar with the art, the present disclosure may be embodied in other specific forms without depending from the spirit or essential characteristics thereof. Accordingly, the disclosures and descriptions herein are intended to be illustrative, but not limiting, of the scope of the disclosure which is set forth in the following claims.

The invention claimed is:

1. A driver for a light-emitting diode (LED), configured to be coupled between the LED and an external device, the driver comprising:
   controller circuitry, coupled with the LED; and
   an interface circuit, configured to be coupled between the controller and the external device, the interface circuit comprising:
      an interface port configured to be coupled to the external device,
      analog interface circuitry, coupled between the interface port and the controller circuitry and configured to receive an analog signal from the external device via the interface port in a first mode and transmit the analog signal to the controller circuitry in the first mode,
      digital interface circuitry, coupled between the interface port and the controller circuitry and configured to receive a digital signal from the external device via the interface port in a second mode and transmit the digital signal to the controller circuitry in the second mode and a third mode, and
      a power supply comprising at least one voltage source, the power source being coupled to the interface port and configured to provide energy to the external device via the interface port in the first mode and the third mode.

2. The driver according to claim 1, wherein the controller circuitry is configured to:
   enable the analog interface circuitry the power supply circuitry in the first mode;
   enable the digital interface circuitry, and disable the analog interface circuitry in the second mode; and
   enable the digital interface circuitry and the power supply circuitry module, and disable the analog interface circuitry in the third mode.

3. The driver according to claim 1, wherein the power supply has a first output current limit in the first mode and a second output current limit different than the first output current limit in the third mode.

4. The driver according to claim 3, wherein the power supply comprises a first voltage source having the first output current limit and a second voltage source having the second output current limit; and the controller circuitry is configured to enable the first voltage source and disable the second voltage source in the first mode, disable the first and second voltage sources in the second mode, and enable the second voltage source and disable the first voltage source in the third mode.

5. The driver according to claim 3, wherein the power supply comprises a first voltage source having the first output current limit and a second voltage source having the second output current limit; and
the controller circuitry is configured to disable the second voltage source in the first mode and second mode, and enable the second voltage source in the third mode.

6. The driver according to claim 1, wherein the analog interface circuitry comprises a dimming interface configured to transmit a dimming signal from the external device to the controller circuitry, and the controller circuitry is configured to control the LED according to the dimming signal.

7. The driver according to claim 1, wherein the digital interface circuitry comprises a digital addressable lighting interface (DALI) circuitry configured to transmit a DALI signal from the external device to the controller circuitry, and the controller circuitry is configured to control the LED according to the DALI signal.

8. The driver according to claim 1, wherein the digital interface circuitry comprises a digital addressable lighting interface (DALI) circuitry configured to transmit parameter data of the LED from the controller to the external device.

9. The driver according to claim 1, wherein the interface port comprises two terminals, and each terminal is configured to be coupled to the external device via a wire.

10. An LED system configured to communicate with an external device, the LED system comprising:
a LED;
controller circuitry, coupled with the LED; and
an interface circuit, configured to be coupled between the controller and the external device, the interface circuit comprising:
an interface port configured to be coupled to the external device,
analog interface circuitry, coupled between the interface port and the controller circuitry and configured to receive an analog signal from the external device via the interface port in a first mode and transmit the analog signal to the controller circuitry in the first mode,
digital interface circuitry, coupled between the interface port and the controller circuitry and configured to receive a digital signal from the external device via the interface port in a second mode and transmit the digital signal to the controller circuitry in the second mode and a third mode, and
a power supply comprising at least one voltage source, the power source being coupled to the interface port and configured to provide energy to the external device via the interface port in the first mode and the third mode.

11. The LED system according to claim 10, wherein the power supply has a first output current limit in the first mode and a second output current limit different than the first output current limit in the third mode.

12. The LED system according to claim 11, wherein the power supply comprises a first voltage source having the first output current limit and a second voltage source having the second output current limit; and
the controller circuitry is configured to enable the first voltage source and disable the second voltage source in the first mode, disable the first and second voltage source in the second mode, and enable the second voltage source and disable the first voltage source in the third mode.

13. The LED system according to claim 11, wherein the power supply comprises a first voltage source having the first output current limit and a second voltage source having the second output current limit; and
the controller circuitry is configured to disable the second voltage source in the first mode and second mode, and enable the second voltage source in the third mode.

14. A method for transmitting a signal between an LED and an external device, the method comprising:
transmitting the signal by an interface circuit coupled between the external device and controller circuitry, wherein the controller is coupled with the LED and the interface circuit is coupled with the external device via an interface port, wherein the transmitting of the signal comprises:
receiving an analog signal from the external device and transmitting the analog signal to the controller circuitry via the interface port by analog interface circuitry in a first mode,
receiving a digital signal from the external device and transmitting the digital signal to the controller circuitry via the interface port by digital interface circuitry in a second mode and a third mode, and
providing energy to the external device via the interface port by a power supply in the first mode and the third mode, the power supply comprising at least one voltage source.

15. The method according to claim 14, further comprising:
enabling the analog interface circuitry and the power supply in the first mode;
enabling the digital interface circuitry, and disabling the analog interface circuitry in the second mode; and
enabling the digital interface circuitry and the power supply circuitry, and disabling the analog interface circuitry in the third mode.

* * * * *